US006525995B1

(12) United States Patent
Diehl et al.

(10) Patent No.: US 6,525,995 B1
(45) Date of Patent: Feb. 25, 2003

(54) METHOD AND APPARATUS FOR DISPLAYING LOCAL TIME ON RADIO-CONTROLLED TIMEPIECES

(75) Inventors: Thomas Diehl, Nürnberg (DE); Peter Kalisch, Nürnberg (DE)

(73) Assignee: Junghans Uhren GmbH, Schramberg (DE)

( * ) Notice: Subject to any disclaimer, the term of this patent is extended or adjusted under 35 U.S.C. 154(b) by 55 days.

(21) Appl. No.: 09/644,686

(22) Filed: Aug. 24, 2000

(30) Foreign Application Priority Data

Aug. 24, 1999 (DE) ........................................ 199 40 114

(51) Int. Cl.$^7$ ........................ G04C 11/02; H04B 7/185; H04B 7/00

(52) U.S. Cl. .................... 368/47; 342/353; 342/357.06; 455/66; 455/73

(58) Field of Search ............................... 368/46–52, 55, 368/10; 370/503, 507, 508; 375/354–358; 455/412, 458, 461, 66, 73; 340/7.1, 7.21, 825.52; 379/93.25, 110.81

(56) References Cited

U.S. PATENT DOCUMENTS

| | | | | | |
|---|---|---|---|---|---|
| 4,650,344 | A | | 3/1987 | Allgaier et al | |
| 5,105,396 | A | | 4/1992 | Ganter et al. | |
| 5,319,374 | A | * | 6/1994 | Desai et al. | 342/387 |
| 5,521,887 | A | * | 5/1996 | Loomis | 368/47 |
| 5,677,895 | A | * | 10/1997 | Mankovitz | 368/10 |
| 5,805,530 | A | * | 9/1998 | Youngberg | 368/47 |
| 6,016,322 | A | * | 1/2000 | Goldman | 370/508 |
| 6,219,302 | B1 | * | 4/2001 | Tanoguchi et al. | 368/47 |
| 6,236,623 | B1 | * | 5/2001 | Read et al. | 368/46 |

FOREIGN PATENT DOCUMENTS

| | | |
|---|---|---|
| DE | 43 13 945 | 11/1994 |
| EP | 0 180 155 | 5/1986 |
| EP | 0 455 183 | 11/1991 |

OTHER PUBLICATIONS

Article: Germany (04/89) "Funkgesteuerte Uhren . . . " Radio–Controlled Timepieces—Everyday timepieces of the 21$^{st}$ Century?, K. Baderschneider; Journal Uhren, Juwelen, Schmuck (UJS).

* cited by examiner

*Primary Examiner*—Vit Miska
(74) *Attorney, Agent, or Firm*—Burns, Doane, Swecker & Mathis, LLP

(57) ABSTRACT

A radio-controlled timepiece is controlled by time telegrams emitted by a regional transmitter. When the timepiece is out of the effective range of the regional transmitter, the timepiece is controlled by a local (i.e., close-range) transmitter which transmits time telegrams that have the same frequency and encoding as the time telegrams from the regional transmitter. The local transmitter receives time information from a remote source, such as navigational satellites, or alternatively a time server by way of the internet, in order to create the local time telegrams.

16 Claims, 1 Drawing Sheet

METHOD AND APPARATUS FOR DISPLAYING LOCAL TIME ON RADIO-CONTROLLED TIMEPIECES

BACKGROUND OF THE INVENTION

The invention concerns a method and apparatus for providing local time signals to a radio-controlled timepiece when a current location of the timepiece is outside of the range of a regional time transmitter.

The features of the general kind set forth are known from the article "Radio-controlled timepieces—Everyday timepieces of the 21st Century?" by K. Baderschneider in the journal Uhren, Juwelen, Schmuck (UJS), issue 4/1989, beginning at page 182 (in particular at the end of the first column and the beginning of the second column on page 184). That article discloses that long-distance carriers such as aircraft, railways and buses, can emit time signals representing the respectively applicable local time in order to enable the passengers to set their radio-controlled wristwatches to the local time.

In particular it is proposed therein for air travel that time and position information of a global radio navigational system (for example OMEGA, LORAN, NAVSTAR, and GPS) be received by equipment on the aircraft. The current local time which is derived therefrom, by a processing step involving radio-engineering procedures, can be emitted by way of an on-board communication system on a technically convenient frequency, so that the passengers' radio-controlled wristwatches, which are specifically designed for that purpose, then display the time corresponding to the instantaneous flight position. That proposal admittedly sounds promising but it is technically too expensive to be an attractive proposition in terms of price for consumers, having regard to the inevitably comparatively slight spread of such systems, especially because provision has to be made in one timepiece for receiving the signals of both a conventional stationary regional transmitter and an on-board transmitter.

It is known from DE 43 13 945 A1, for the purposes of spreading local normal time information, to use a large number of satellites which are on low polar orbits (so-called LEOS) as relay stations for a worldwide reference time, with the particularity that each satellite converts the time information which is to be radiated therefrom into the time zone which is associated with its polar orbit. Thus, on the ground, the local time is received directly from that satellite and displayed. However impressive that system seems, it nonetheless suffers from the practical disadvantage that the time zone changes involve, in principle, a gradation in each case of only 15 degrees of longitude while in actual fact the time zone boundaries extend along boundaries of countries or states. Thus for example at least three different time zones apply in South America along a strip of 15 degrees from South to North. Added to that is the fact that the acquisition areas of such telecommunication satellites overlap widely on the ground so that in most reception zones it is not possible to derive a clear association in respect of the geographical position with a given one of the satellites from the intensity of reception thereof. If however the receiving device, for example the wristwatch, is tuned to receive only one given satellite which is associated with that time zone, then once again there cannot be an automatic change in the local time display when travelling across time zones. Therefore, much more expensive means would have to be used for identification, at the receiving end, of locally associated satellites. Finally, particularly in the case of wristwatches, there is the fundamental difficulty of sufficiently reliably receiving the weak and very high-frequency satellite signals; at least, for that purpose there must be a free view of the heavens over a certain period of time, which is not readily ensured in the case of a low satellite orbit in densely populated areas or in mountainous countryside.

In principle, reception problems of that kind occur even with a higher satellite orbit as in the case of the navigational satellite systems referred to in the opening part of this specification. Those systems, in terms of receiving and displaying items of time information, also involve the additional problem of operating their own time base which does not run synchronously with the coordinated world time (GMT). For example, in the case of GPS, the time base does not contain either switching seconds or items of information relating to Summer time/Winter time change; and the time format is rather unsuitable for consumer purposes because it is only based on counting the weeks from Jan. 6, 1980 and the seconds within each week begun—with the additional limitation that time counting begins again at 0 after each 1023 weeks. Upon direct reception of an item of GPS time information with a consumer timepiece, therefore, a considerable amount of processing complication and expenditure must be implemented in the timepiece in order to convert the GPS system time into a correct world time, although this still does not always give a correct local time display.

In this respect, the dissemination of items of regionally correct time information by means of encoded signals on telegrams by way of regional long-wave transmitters such as in particular the transmitter DCF 77 at Frankfurt (Main) in Germany for dissemination of the official Central European Time has the inestimable advantage that, because of ground wave dispersion of the long waves and their capacity for penetration even into moderately well-screened spaces, practically everywhere in everyday life it is important to be able to sufficiently reliably receive the time telegrams even with miniaturized antennae and receivers in wristwatches. That applies in a large area of at least 1000 km radius, that is to say at any event over the region of a time zone. There is therefore only precisely the problem that the consumer does not see from his watch when he changes from one respective time zone to another when crossing the River Oder in the East or the English Channel in the West, because the continuing reception of the regional transmitter in Frankfurt still causes a display of the current Central European time.

Admittedly, regional time transmitters are operated in various regions of the Earth such as in particular in North America, in Great Britain and in Japan, which emit real-time telegrams in accordance with the local time of the location of the transmitter or in relation to the world time UTC. However, for the simple reason of avoiding interference phenomena which disturb operation thereof, each transmitter operates on a different frequency. In addition, the data format of the telegram encodings of the respective regional time transmitters is greatly different, so that even the complication and expenditure for frequency changing in the radio-controlled timepiece would still not be sufficient to ensure that, in the reception area of another regional time transmitter, the timepiece can automatically display the local time thereof.

In consideration of those factors and problems which relate in particular to the demand for a consumer radio-controlled timepiece which can be produced economically and which can be used without difficulty in any time zone, the object of the present invention is to provide for consumers, in regions in which regional time telegram transmitters cannot be received, a local time which is always directly accurate and which is derived from a time base available on a supraregional basis, such as in particular a satellite system or an Internet time provider.

SUMMARY OF THE INVENTION

In accordance with the invention that object is essentially achieved in that a conversion into the local time at the place of operation is effected in local satellite or Internet time receivers operated in a stationary or mobile mode, and that time information is then in turn radiated again in the format (that is to say at the frequency and with the encoding pattern) of a current regional time transmitter such as in particular the DCF 77, with a very low level of transmission power—and thus receivable only in the close-range region.

That has a quite substantial advantage for the consumer that his radio-controlled clock which is tuned to reception of the domestic regional time transmitter can be operated practically anywhere in the world without any need for intervention, because, outside the time zone which applies in respect of that regional time transmitter, only locally-operated small-scale transmitters deliver a higher level of reception strength. Thus, when the consumer passes, his/her timepiece is set to the local time which is currently applicable there, for example after passing a motorway or expressway limit or border station or after alighting from a train at a railway border station.

The radio-controlled clock when thus once set to the locally accurate time then continues to run autonomously under quartz control until, in the same time zone, confirmation of the displayed timepiece time is received or, after the wearer of the timepiece travels farther into another time zone, a local close-range transmitter which is operated there supplies the local time which is applicable in that zone.

In order therefore always to permit an accurate local time display on a worldwide basis by means of conventional radio-controlled timepieces, it is proposed in accordance with the invention that close-range transmitters are operated locally with a minimum level of transmission energy. The transmitters would radiate, at the same frequency and with the same encoding as one of the established regional long-wave time transmitters, time telegrams which contain the local time information derived from a global satellite or Internet time base. In that way, consumer radio-controlled timepieces such as in particular alarm clocks and wristwatches can be operated worldwide although they are only designed for the frequency and encoding of a regional time transmitter such as the Central European long-wave standard time transmitter DCF 77.

Such a local time converter can therefore also be designed as a wireless Internet access, in order to obtain the information which is to be converted into locally applicable time telegrams, not primarily as items of positioning auxiliary information by way of a satellite antenna but already in date time format for example in accordance with the NTP-protocol from the WWW. This affords the advantages, for the functions of a position identifier or sender and possibly a time converter, of having recourse to computing and storage capacities of the Internet browser, and then, besides the local time information, also being able to transmit by way of the close-range transmitter further items of current information such as for example indications of the presence of fax or e-mail messages.

BRIEF DESCRIPTION OF THE DRAWINGS

Additional alternatives and developments as well as further features and advantages of the invention will be apparent from the description hereinafter of preferred embodiments of an apparatus and method according to the invention, the embodiments being diagrammatically shown in greatly simplified form in the drawing, being limited to what is essential. In particular.

DETAILED DESCRIPTION OF PREFERRED EMBODIMENTS OF THE INVENTION

Figure 1:
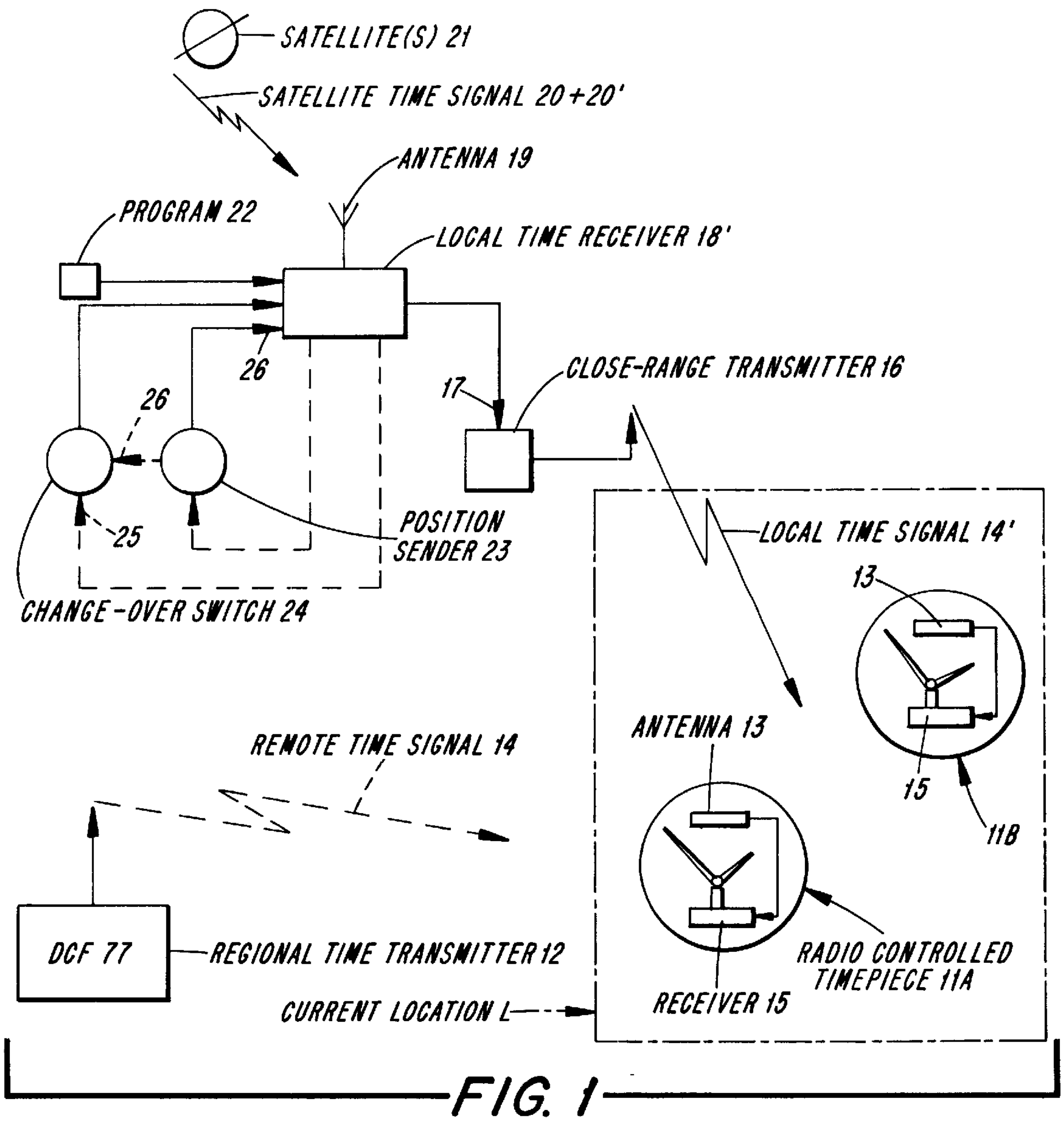
FIG. 1 is a schematic representation of a regional time transmitter, timepieces disposed in a location outside of the effective range of the regional transmitter, a local time transmitter, and a source of time information in the form of navigational satellites (only one being depicted)

FIG. 1 diagrammatically shows how conventionally equipped consumer radio-controlled timepieces 11A, 11B, constructed for example, in accordance with EP 0 180 155 B1 or EP 0 455 183 B1, in the form of travelling alarms or wristwatches, are operated outside the reception region of a regional long-wave time transmitter 12 such as the Central European time transmitter DCF 77 (Frankfurt/Main in Germany). More specifically, at an excessively great distance, the magnetic long-wave antenna 13 which is fitted into the respective radio-controlled timepiece 11A, 11B is no longer capable, or at least reliably capable, of picking up the time telegrams 14 emitted from the regional time transmitter 12 for operation of the receiver 15 which is fitted into the radio-controlled timepiece. The receiver 15 is intended to demodulate and decode the telegrams 14 in order to check the instantaneous time display on the basis of the currently received time information and if necessary correct it to the radio time.

At the current location L at which the radio-controlled timepieces 11A, 11B are to be found, that is to say at any distance away from the regional time transmitter 12 which is associated in terms of circuitry with their receiver circuit, those radio-controlled timepieces receive, without any problem, time telegrams 14' emitted by a close-range transmitter 16. The time telegrams 14' are the same as those telegrams 14 emitted from the home regional time transmitter 12 with regard to frequency and encoding, but the telegrams 14' contain the current local time at the location of operation L of the close-range transmitter 16. Therefore the radio-controlled timepiece 11 of the consumer who has arrived at location L from another time zone is now corrected to display the applicable local time of location L, without any interventions whatsoever being required in the mode of operation of the radio-controlled timepiece, with its receiver demodulator which is designed primarily for operation in the reception area of a regional time transmitter 12 in an entirely different time zone.

It will be noted however that the locally operated close-range transmitter 16 cannot acquire its time information from the time telegram 14 of the regional time transmitter 12 if that telegram 14 cannot be picked up at the location of operation L by the reception devices of the close-range transmitter 16, for example by virtue of the distance involved or by virtue of particular geographical or structural factors. Therefore the close-range transmitter 16 is fed with a signal containing local time information 17 which is to be converted to the time telegram 14' and which is generated in a locally operated time receiver 18'. When the receiver is in the form of a satellite receiver 18', it is installed in such a way that its microwave antenna 19 receives without problem the position information 20 which includes a system time 20', from a remote source of time information in the form of at least one navigational satellite 21. By means of an adaptation program 22, the position-specific time format (in the GPS configuration comprising only continuous second information in one of 1023 weeks) is converted into the conventional date time format which is familiar to the consumer. In addition for example connected to the satellite receiver 18' is a position identifier or sender 23 which, by virtue of manual presetting, or based on satellite position determination from an association table, imposes on the converted satellite system time 20' the local time shift at the location of operation in order in that way to obtain the local time information 17 for feeding the close-range transmitter 16. A time changeover switch 24 can be connected in the same manner, which effects the Summer time/Winter time change-over switching procedures which are provided by statute here, for the date information 25 which is extracted from the system time information 20' and for the local position 26 which is supplied by the position sender 23. The date information 25 and the local position 26 therefore do not have to be manually inputted, but can be derived in the local time receiver 18 from the items of satellite position information 20 as symbolically indicated in the drawing.

Figure 2:
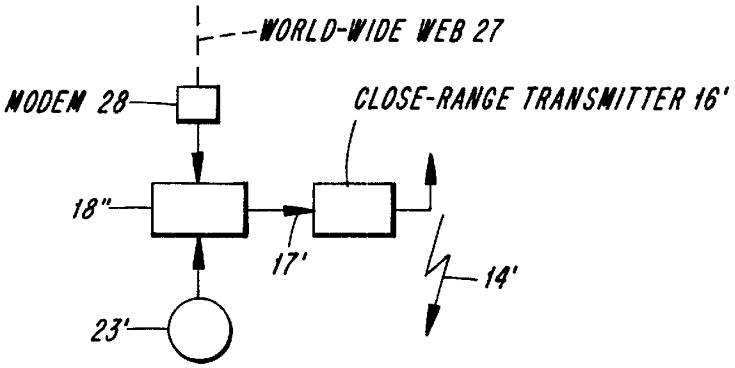
FIG. 2 depicts an alternative way of proving time information to the local receiver, in the form of a computer network in for connecting to a computer network (e.g., the world-wide internet).

It is further to be taken into consideration in this respect that the local time receiver, as shown in FIG. 2, could comprise an internet access 18", for example in the conventional form of a PC, a laptop or a radio telephone with a browser function for wireless or cable access to a network 27 such as the World Wide Web by way of a modem 28. By way of the network provider, there is then provided access to a remote source of time information in the form of one of the internally operated time servers which disseminate the world time or a zone time by way of the network 27 for example in the NTP format. It will be appreciated that in such a case, depending on the respective time format, the local position 26 is to be inputted by way of a position sender 23' into the time receiver 18" and in that way the change is to be made from the locally radiated time telegrams 14' to local time; while the Summer time/Winter time change can be operated for the individual locations from the server.

In summary, in order to permit world-wide accurate local time display by means of conventional radio-controlled timepieces, it is proposed in accordance with the invention that close-range transmitters be operated locally with a minimum level of transmission energy. The transmitters radiate, at the same frequency and with the same encoding as one of the established regional long-wave time transmitters, time signals which contain the local time information derived from a satellite time base or from an internet time server. In that way, consumer radio-controlled timepieces such as alarm clocks and wristwatches can be operated world-wide although they are only designed for the frequency and encoding of a regional long-wave time transmitter such as the Central European Standard Time transmitter DCF 77. The time receiver can therefore be designed not only as a satellite receiver but also as a wireless internet access in order to obtain the information to be converted into locally applicable time signals not as items of position information by way of a satellite antenna but already in date time format, for example in accordance with the NTP-protocol from the WWW. That affords the advantages that, for the functions of a position sender and possibly a time change-over switch, it is possible to have recourse to computing and storage capacities of the internet browser and then to be able to transmit by way of the close-range transmitter, in addition to the local time information, further items of current information such as for example the presence of fax or e-mail messages.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of providing time signals to a radio controlled timepiece comprising providing signals to the timepiece from a regional time transmitter at a first level of transmission energy, and when a current location of the timepiece is out of the effective range of the regional time transmitter, comprising the step of causing a close-range transmitter to radiate in the current location, and at a second level of transmission energy lower than the first level of transmission energy of the regional time transmitter, local time telegrams having the same frequency and encoding as time telegrams emitted by the regional time transmitter, wherein the local time telegrams are received by a receiver of the timepiece.

2. The method according to claim 1 further including the steps of:

supplying a local time receiver with information from a navigational satellite, causing the local time receiver to convert the information supplied by the satellite to a date/time format having a location-dependent time shift with respect to a reference time, and feeding locally accurate time information from the local time receiver to the close-range transmitter.

3. The method according to claim 2 further including the step of supplying to the local time receiver a winter/summer time change-over signal.

4. The method according to claim 1 further including the steps of supplying a local time receiver with local time information from a time server through a computer network connected to the local time receiver, and feeding the local time information to the local time receiver.

5. The method according to claim 1 further including the step of transmitting from the close-range transmitter to the timepiece, facsimile information signals.

6. The method according to claim 1 further including the step of transmitting from the close-range transmitter to the timepiece, e-mail information signals.

7. A system for supplying time signals to a radio controlled timepiece, comprising:

a regional time transmitter for transmitting time telegrams having a frequency and an encoding at an energy level;

a local transmitter for transmitting local time telegrams at a weaker power than those of the regional time transmitter for controlling a timepiece whose current location is out of the effective range of the regional time transmitter, the local time telegrams having the same frequency and encoding as the regional time signals;

a source of time information telegrams disposed remotely of the local transmitter for emitting system time information telegrams; and a local time receiver for receiving the system time information telegrams from the source and connecting those telegrams into local time signals and feeding the local time telegrams to the local transmitter.

8. The system according to claim 7 wherein the source of time information comprises a navigational satellite.

9. The system according to claim 8 wherein the navigational satellite is operable to transmit position information signals to the local time receiver.

10. The system according to claim 9 wherein the local time receiver includes an adaptation program for converting a format of the system time information telegrams into a date/time format for encoding the time telegrams fed to the local transmitter.

11. The system according to claim 8 wherein the local time receiver includes a position sender for compensating for a time zone shift.

12. The system according to claim 8 wherein the local time receiver includes a time change-over switch for switching between winter/summer time changes.

13. The system according to claim 7 wherein the source of time information comprises a time server connected to the local time receiver by a computer network.

14. The system according to claim 13 wherein the local time receiver comprises a personal computer.

15. The system according to claim 14 wherein the personal computer includes a program for determining local time information from the time server time protocol.

16. The system according to claim 13 wherein the local time receiver comprises a radio telephone.

* * * * *